(12) United States Patent
Höglund (10) Patent No.: US 10,785,746 B2
(45) Date of Patent: Sep. 22, 2020

(54) COVERAGE ENHANCEMENT SERVICE MODE SELECTION

(71) Applicant: Telefonaktiebolaget LM Ericsson (publ), Stockholm (SE)

(72) Inventor: Andreas Höglund, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 102 days.

(21) Appl. No.: 15/768,069

(22) PCT Filed: Oct. 7, 2016

(86) PCT No.: PCT/SE2016/050963
§ 371 (c)(1),
(2) Date: Apr. 13, 2018

(87) PCT Pub. No.: WO2017/078590
PCT Pub. Date: May 11, 2017

(65) Prior Publication Data
US 2018/0302876 A1    Oct. 18, 2018

Related U.S. Application Data

(60) Provisional application No. 62/251,361, filed on Nov. 5, 2015.

(51) Int. Cl.
*H04W 68/00* (2009.01)
*H04W 24/02* (2009.01)
(Continued)

(52) U.S. Cl.
CPC ......... *H04W 68/005* (2013.01); *H04L 1/1812* (2013.01); *H04W 24/02* (2013.01);
(Continued)

(58) Field of Classification Search
CPC ............... H04W 68/005; H04W 24/02; H04W 36/0088; H04W 76/30; H04W 76/27; H04W 68/00; H04W 72/04; H04L 1/1812
See application file for complete search history.

(56) References Cited

U.S. PATENT DOCUMENTS 9,706,336 B2 *  7/2017  Rashid ................. H04W 4/70
2014/0098761 A1 *  4/2014  Lee ...................... H04W 72/005
370/329

(Continued)

FOREIGN PATENT DOCUMENTS

EP            2903195 A1     8/2015
WO       2014204285 A1    12/2014
(Continued)

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401 V13.4.0, Sep. 2015, 1-334.

*Primary Examiner* — Ajay Cattungal
(74) *Attorney, Agent, or Firm* — Sage Patent Group (57) ABSTRACT

There is provided a method for coverage enhancement service mode selection. The method is performed by a wireless device. The method comprises obtaining an indication to switch between a first coverage enhancement service mode and a second coverage enhancement service mode. The method comprises selectively switching between the first coverage enhancement service mode and the second coverage enhancement service mode according to the indication. There is also provided a wireless device configured to perform such a method. There is also performed a method for coverage enhancement service mode selection as per- (Continued)

formed by a network node and a network configured to perform such a method.

15 Claims, 6 Drawing Sheets

(51) Int. Cl.
 *H04W 36/00*  (2009.01)
 *H04W 76/30*  (2018.01)
 *H04W 76/27*  (2018.01)
 *H04L 1/18*  (2006.01)
 *H04L 1/00*  (2006.01)
 *H04W 72/04*  (2009.01)

(52) U.S. Cl.
 CPC ....... *H04W 36/0088* (2013.01); *H04W 76/27* (2018.02); *H04W 76/30* (2018.02); *H04L 1/00* (2013.01); *H04W 68/00* (2013.01); *H04W 72/04* (2013.01)

(56) References Cited

U.S. PATENT DOCUMENTS

| 2015/0016312 | A1* | 1/2015 | Li | H04L 5/14 370/280 |
| 2015/0271686 | A1* | 9/2015 | Jha | H04W 24/02 370/329 |
| 2015/0334659 | A1* | 11/2015 | Dimou | H04W 52/0274 370/311 |
| 2016/0157169 | A1* | 6/2016 | Ljung | H04W 48/18 455/418 |

FOREIGN PATENT DOCUMENTS

| WO | 2015113228 A1 | 8/2015 |
| WO | 2016167570 A1 | 10/2016 |
| WO | 2016171445 A1 | 10/2016 |

* cited by examiner

COVERAGE ENHANCEMENT SERVICE MODE SELECTION

TECHNICAL FIELD

Embodiments presented herein relate to methods, a wireless device, a network node, computer programs, and a computer program product for coverage enhancement service mode selection.

BACKGROUND

In communications networks, there may be a challenge to obtain good performance and capacity for a given communications protocol, its parameters and the physical environment in which the communications network is deployed.

For example, application in a communications network is so-called machine type communication (MTC). In general terms, MTC involves providing network connectivity for a type of devices that communicate without human interaction. Examples include, but are not limited to Internet-of-Things (IoT) devices, sensors, etc. Because of the different nature of machine type communication compared to human initiated communications, the requirements are also different from those of human initiated communications, and hence result in different network traffic patterns. In general terms, MTC devices should have low cost. This could be achieved by low device complexity and reduced device capabilities (such as only one receiving antenna, a narrow device bandwidth, etc.) compared to devices, such as user equipment, used for human initiated communications. The power consumption of MTC devices should further be low in order to prolong battery life such that interactive battery charging is not required, preferably throughout the life span of the MTC device. To be able to communicate with MTC devices located in challenging location, e.g., basements, it is desirable to enhance coverage in comparison to communications networks designed for human initiated communications.

In the 3rd Generation Partnership Project (3GPP), Release 13 (Rel-13) relates to coverage enhancements (CE) for MTC devices. Coverage enhancements are achieved by time repetition in a transmission time interval (TTI) bundling manner, similar to that introduced for Voice over IP (VoIP) in 3GPP Release 8 (Rel-8). In Rel-8, TTI bundling is limited to the uplink (i.e., communications from device to network) shared data channel and fixed to four repetitions. For Rel-13 MTC devices requiring coverage enhancements, the number of repetitions can be configured per cell or per MTC device, and can also be applied to the downlink (i.e., communications from network to device). Link simulations show that the number of required repetitions can be in the order of 100 to achieve a 15 dB gain for some channels.

In 3GPP Release 12 (Rel-12) a so-called lower complexity (LC) device category (denoted Cat-0) was introduced to support lower manufacturing costs for MTC devices. In Rel-13 further complexity reductions are introduced, reducing the device bandwidth to 6 PRBs or 1.4 MHz. This means that some legacy channels such as the downlink control channel (Physical Downlink Control Channel, PDCCH), which spans over the entire system bandwidth, cannot be received. The working assumption for these low complexity wireless devices is to replace the PDCCH with an updated channel, the enhanced PDCCH (denoted EPDCCH) which is transmitted only within 6 PRBs (referred to as M-PDCCH, where M is the number of PDCCH candidates to monitor in a given search space). The lower complexity of the MTC devices means that a small number of repetitions of any data and control signalling transmitted to the MTC devices might be needed also for these MTC devices in normal coverage. That is, to counteract the losses from using only one receiving antenna (as in Rel-12), loss of frequency diversity (as in Rel-13), etc.

The coverage enhancement in Rel-13 is mainly intended for Rel-13 LC devices (e.g., MTC devices). However, coverage enhancement may also be available to full complexity devices (i.e., non-LC devices). This could lead to a high consumption of radio resources. For example, a large number of repetitions may quickly drain the battery of the full complexity devices, and may have a negative impact on the network capacity. It has therefore been discussed whether non-LC devices in normal coverage must monitor legacy paging, CE paging or both legacy paging and CE paging. In this respect, the network does not have full knowledge of the position of the devices (i.e., the non-LC devices). If the devices move from normal coverage the only option may be that the devices monitor CE paging and the radio access network node transmits CE paging, thus resulting in negative impacts on the network as disclosed above. Further, although most devices are not in the worst coverage level, the device may still need to monitor the highest number of repetitions at the highest level since the network is not aware of where the device is located.

Hence, there is still a need for an improved handling of coverage enhancement aspects in a communications network.

SUMMARY

An object of embodiments herein is to provide efficient handling of coverage enhancement in a communications network.

According to a first aspect there is presented a method for coverage enhancement service mode selection. The method is performed by a wireless device. The method comprises obtaining an indication to switch between a first coverage enhancement service mode and a second coverage enhancement service mode. The method comprises selectively switching between the first coverage enhancement service mode and the second coverage enhancement service mode according to the indication.

According to a second aspect there is presented a wireless device for coverage enhancement service mode selection. The wireless device comprises processing circuitry. The processing circuitry is configured to cause the wireless device to obtain an indication to switch between a first coverage enhancement service mode and a second coverage enhancement service mode. The processing circuitry is configured to cause the wireless device to selectively switch between the first coverage enhancement service mode and the second coverage enhancement service mode according to the indication.

According to a third aspect there is presented a computer program for coverage enhancement service mode selection, the computer program comprising computer program code which, when run on processing circuitry of a wireless device, causes the wireless device to perform a method according to the first aspect.

According to a fourth aspect there is presented a method for coverage enhancement service mode selection. The method is performed by a network node. The method comprises obtaining an indication for a wireless device to switch between a first coverage enhancement service mode and a second coverage enhancement service mode. The method comprises selectively switching the wireless device between the first coverage enhancement service mode and the second coverage enhancement service mode according to the indication.

According to a fifth aspect there is presented a network node for coverage enhancement service mode selection. The network node comprises processing circuitry. The processing circuitry is configured to cause the network node to obtain an indication for a wireless device to switch between a first coverage enhancement service mode and a second coverage enhancement service mode. The processing circuitry is configured to cause the network node to selectively switch the wireless device between the first coverage enhancement service mode and the second coverage enhancement service mode according to the indication.

According to a sixth aspect there is presented a computer program for coverage enhancement service mode selection, the computer program comprising computer program code which, when run on processing circuitry of a network node, causes the network node to perform a method according to the fourth aspect.

According to a seventh aspect there is presented a computer program product comprising a computer program according to at least one of the third aspect and the sixth aspect and a computer readable means on which the computer program is stored.

Advantageously this wireless device, this network node, these methods, and these computer programs provide efficient handling of coverage enhancement in a communications network Advantageously, selectively switching the wireless device between the first coverage enhancement service mode and the second coverage enhancement service mode enables the wireless device to improve its battery life since a coverage enhancement service mode with many transmission repetitions only could be entered when needed.

Advantageously, selectively switching the wireless device between the first coverage enhancement service mode and the second coverage enhancement service mode enables the network node to conserve its radio resources since a coverage enhancement service mode with many transmission repetitions only could be entered when needed. This could save radio resources since transmissions do not have to be repeated as much.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers refer to like elements throughout the description. Any step or feature illustrated by dashed lines should be regarded as optional.

Figure 1:
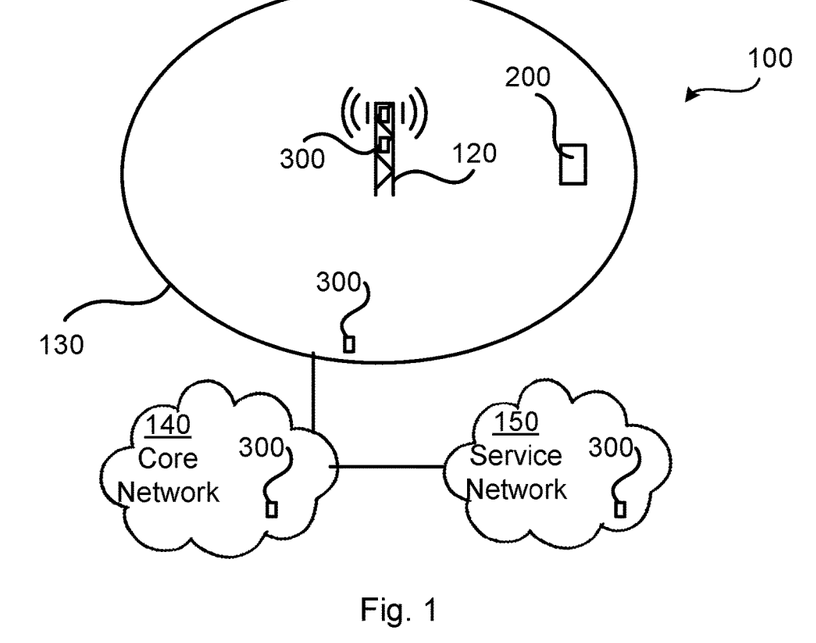
FIG. 1 is a schematic diagram illustrating a communication network according to embodiments.

FIG. 1 is a schematic diagram illustrating a communications network 100 where embodiments presented herein can be applied.

The communications network 100 comprises at least one network node 300. The at least one network node 300 may be provided in, or installed on, a radio access network node 120 or in another entity or device in a radio access network 130, in an entity or device of a core network 140, or in an entity or device of a service network 150. The functionality of the network node 300 will be further disclosed below.

The radio access network node 120 is operatively connected to a core network 140, which, in turn, is operatively connected to a service providing network 150. The radio access network node 120 provides network access to at least one wireless device 200. The wireless device 200 may thereby access services and exchange data with entities of the core network 140 and the service network 150

Examples of wireless devices 200 include, but are not limited to, mobile stations, mobile phones, handsets, wireless local loop phones, user equipment (UE), smartphones, laptop computers, and tablet computers. The wireless devices 200 could be Rel-13 non-LC devices. However, the embodiments are not limited to such wireless devices; the wireless devices could be Rel-12 LC devices, such as wireless MTC devices.

Examples of radio access network nodes 120 include, but are not limited to, radio base stations, base transceiver stations, node Bs, evolved node Bs, and access points. As the skilled person understands, the communications network 100 may comprise a plurality of radio access network nodes 120, each providing network access to a plurality of wireless devices 200. The herein disclosed embodiments are no limited to any particular number of radio access network nodes 120, network nodes 300, or wireless devices 200.

The embodiments disclosed herein relate to mechanisms for coverage enhancement service mode selection. In order to obtain such mechanisms there is provided a wireless device 200, a method performed by the wireless device 200, a computer program product comprising code, for example in the form of a computer program, that when run on processing circuitry of the wireless device 200, causes the wireless device 200 to perform the method. In order to obtain such mechanisms there is further provided a network node 300, a method performed by the network node 300, and a computer program product comprising code, for example in the form of a computer program, that when run on processing circuitry of the network node 300, causes the network node 300 to perform the method.

Figure 2A:
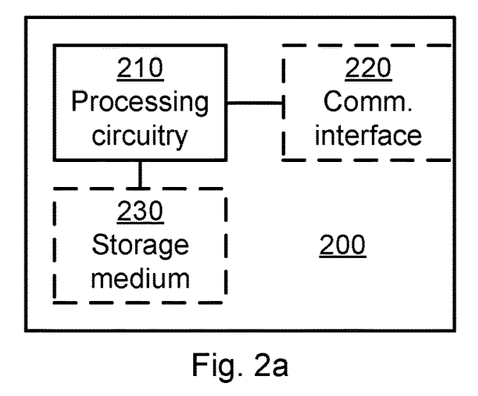
FIG. 2a is a schematic diagram showing functional units of a wireless device according to an embodiment.

FIG. 2a schematically illustrates, in terms of a number of functional units, the components of a wireless device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 410a (as in FIG. 4), e.g. in the form of a storage medium 230. The processing circuitry 210 may further be provided as at least one application specific integrated circuit (ASIC), or field programmable gate array (FPGA).

Particularly, the processing circuitry 210 is configured to cause the wireless device 200 to perform a set of operations, or steps, S102-S118. These operations, or steps, S102-S118 will be disclosed below. For example, the storage medium 230 may store the set of operations, and the processing circuitry 210 may be configured to retrieve the set of operations from the storage medium 230 to cause the wireless device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The wireless device 200 may further comprise a communications interface 220 for communications with at least one network node 300. As such the communications interface 220 may comprise one or more transmitters and receivers, comprising analogue and digital components and a suitable number of antennas for wireless communications.

The processing circuitry 210 controls the general operation of the wireless device 200 e.g. by sending data and control signals to the communications interface 220 and the storage medium 230, by receiving data and reports from the communications interface 220, and by retrieving data and instructions from the storage medium 230. Other components, as well as the related functionality, of the wireless device 200 are omitted in order not to obscure the concepts presented herein.

Figure 2B:
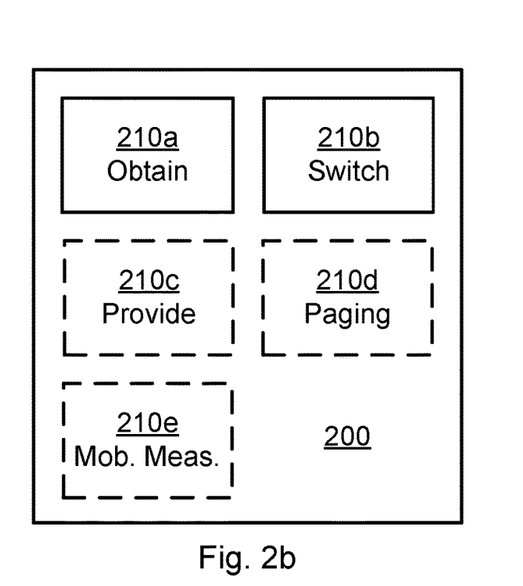
FIG. 2b is a schematic diagram showing functional modules of a wireless device according to an embodiment.

FIG. 2b schematically illustrates, in terms of a number of functional modules, the components of a wireless device 200 according to an embodiment. The wireless device 200 of FIG. 2b comprises a number of functional modules; an obtain module 210a configured to perform below step S102, S108, S112, and a switch module 210b configured to perform below step S114. The wireless device 200 of FIG. 2b may further comprise a number of optional functional modules, such as any of a provide module 210c configured to perform below step S104, S106, S110, a paging module 210d configured to perform below step S116, and a mobility measurement module 210e configured to perform step S118. The functionality of each functional module 210a-210e will be further disclosed below in the context of which the functional modules 210a-210e may be used. In general terms, each functional module 210a-210e may be implemented in hardware or in software. Preferably, one or more or all functional modules 210a-210e may be implemented by the processing circuitry 210, possibly in cooperation with functional units 220 and/or 230. The processing circuitry 210 may thus be arranged to from the storage medium 230 fetch instructions as provided by a functional module 210a-210e and to execute these instructions, thereby performing any steps as will be disclosed hereinafter.

Figure 3A:
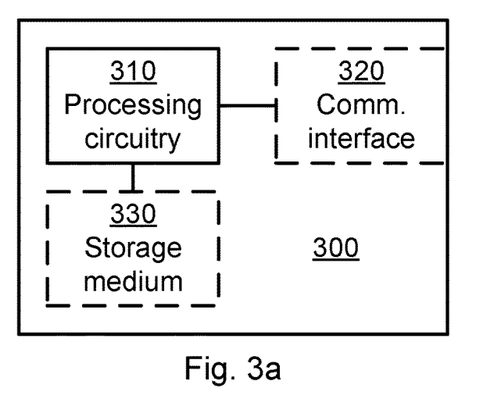
FIG. 3a is a schematic diagram showing functional units of a network node according to an embodiment.

FIG. 3a schematically illustrates, in terms of a number of functional units, the components of a network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 410b (as in FIG. 4), e.g. in the form of a storage medium 330. The processing circuitry 310 may further be provided as at least one application specific integrated circuit (ASIC), or field programmable gate array (FPGA).

Particularly, the processing circuitry 310 is configured to cause the network node 300 to perform a set of operations, or steps, S202-S216. These operations, or steps, S202-S216 will be disclosed below. For example, the storage medium 330 may store the set of operations, and the processing circuitry 310 may be configured to retrieve the set of operations from the storage medium 330 to cause the network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network node 300 may further comprise a communications interface 320 for communications with at least one wireless device 200. As such the communications interface 320 may comprise one or more transmitters and receivers, comprising analogue and digital components and a suitable number of antennas for wireless communications and ports for wireline communications.

The processing circuitry 310 controls the general operation of the network node 300 e.g. by sending data and control signals to the communications interface 320 and the storage medium 330, by receiving data and reports from the communications interface 320, and by retrieving data and instructions from the storage medium 330. Other components, as well as the related functionality, of the network node 300 are omitted in order not to obscure the concepts presented herein.

Figure 3B:
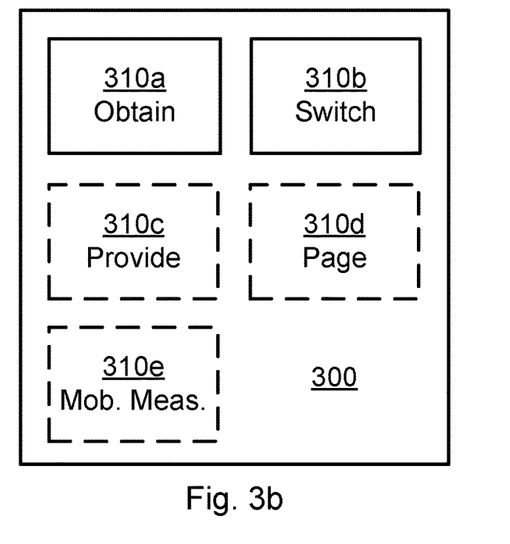
FIG. 3b is a schematic diagram showing functional modules of a network node according to an embodiment.

FIG. 3b schematically illustrates, in terms of a number of functional modules, the components of a network node 300 according to an embodiment. The network node 300 of FIG. 3b comprises a number of functional modules; an obtain module 310a configured to perform below step S202, S202a, S202b, S206, and a switch module 310b configured to perform below step S212. The network node 300 of FIG. 3b may further comprises a number of optional functional modules, such as a provide module 310c configured to perform below step S204, S208, S210, a paging module 310d configured to perform below step S214, and a mobility measurement module 310e configured to perform step S216. The functionality of each functional module 310a-310e will be further disclosed below in the context of which the functional modules 310a-310e may be used. In general terms, each functional module 310a-310e may be implemented in hardware or in software. Preferably, one or more or all functional modules 310a-310e may be implemented by the processing circuitry 310, possibly in cooperation with functional units 320 and/or 330. The processing circuitry 310 may thus be arranged to from the storage medium 330 fetch instructions as provided by a functional module 310a-310e and to execute these instructions, thereby performing any steps as will be disclosed hereinafter.

The network node 300 may be provided as a standalone device or as a part of at least one further device. For example, the network node 300 may be provided in a node of the radio access network or in a node of the core network. Alternatively, functionality of the network node 300 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the radio access network node than instructions that are not required to be performed in real time. In this respect, at least part of the network node 300 may reside in the radio access network, such as in the radio access network node.

Thus, a first portion of the instructions performed by the network node 300 may be executed in a first device, and a second portion of the of the instructions performed by the network node 300 may be executed in a second device; the herein disclosed embodiments are not limited to any particular number of devices on which the instructions performed by the network node 300 may be executed. Hence, the methods according to the herein disclosed embodiments are suitable to be performed by a network node 300 residing in a cloud computational environment. Therefore, although a single processing circuitry 310 is illustrated in FIG. 3a the processing circuitry 310 may be distributed among a plurality of devices, or nodes. The same applies to the functional modules 310a-310d of FIG. 3b and the computer program 420b of FIG. 4 (see below).

Figure 4:
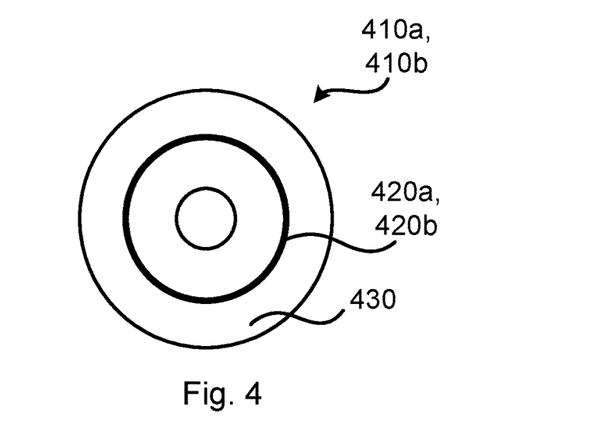
FIG. 4 shows one example of a computer program product comprising computer readable means according to an embodiment.

FIG. 4 shows one example of a computer program product 410a, 410b comprising computer readable means 430. On this computer readable means 430, a computer program 420a can be stored, which computer program 420a can cause the processing circuitry 210 and thereto operatively coupled entities and devices, such as the communications interface 220 and the storage medium 230, to execute methods according to embodiments described herein. The computer program 420a and/or computer program product 410a may thus provide means for performing any steps of the wireless device 200 as herein disclosed. On this computer readable means 430, a computer program 420b can be stored, which computer program 420b can cause the processing circuitry 310 and thereto operatively coupled entities and devices, such as the communications interface 320 and the storage medium 330, to execute methods according to embodiments described herein. The computer program 420b and/or computer program product 410b may thus provide means for performing any steps of the network node 300 as herein disclosed.

In the example of FIG. 4, the computer program product 410a, 410b is illustrated as an optical disc, such as a CD (compact disc) or a DVD (digital versatile disc) or a Blu-Ray disc. The computer program product 410a, 410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 420a, 420b is here schematically shown as a track on the depicted optical disk, the computer program 420a, 420b can be stored in any way which is suitable for the computer program product 410a, 410b.

Figure 5:
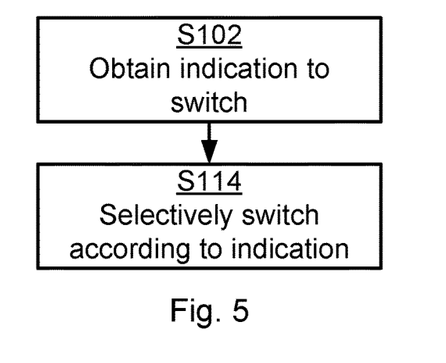
FIGS. 5, 6, 7, 8, 9, 10, and 11 are flowcharts of methods according to embodiments.
Figure 6:
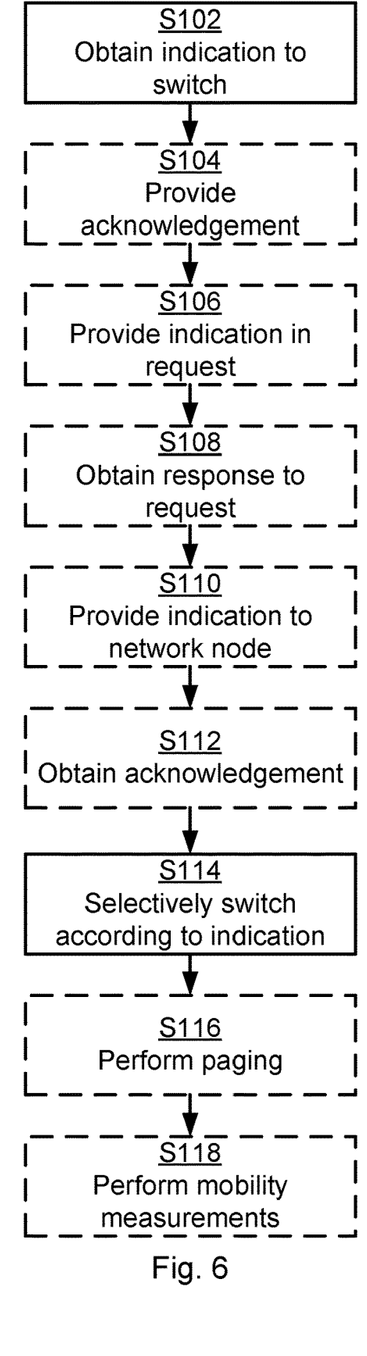
Figure 7:
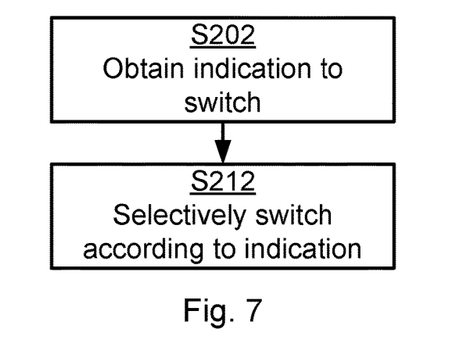
Figure 8:
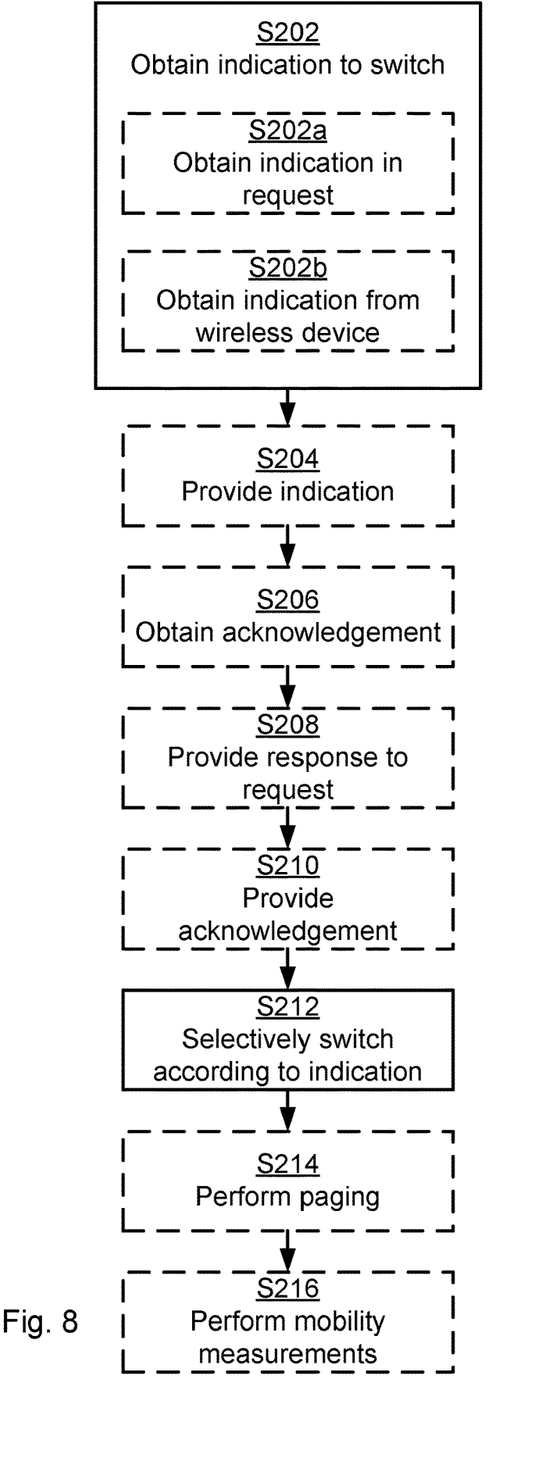

FIGS. 5 and 6 are flow charts illustrating embodiments of methods for coverage enhancement service mode selection as performed by the wireless device 200. FIGS. 7 and 8 are flow charts illustrating embodiments of methods for coverage enhancement service mode selection as performed by the network node 300. The methods are advantageously provided as computer programs 420a, 420b.

Reference is now made to FIG. 5 illustrating a method for coverage enhancement service mode selection as performed by the wireless device 200 according to an embodiment.

The wireless device 200 is assumed to be configured to support at least a first coverage enhancement service mode and a second coverage enhancement service mode. Examples of the first coverage enhancement service mode and the second coverage enhancement service mode will be provided below. The wireless device 200 is therefore configured to, in a step S102, obtain an indication to switch between a first coverage enhancement service mode and a second coverage enhancement service mode. In this respect the obtain module 210a may comprise instructions that when executed by the wireless device 200 causes the processing circuitry 210, possibly in conjunction with the communications interface 220 and the storage medium 230, to obtain the indication in order for the wireless device 200 to perform step S102. Different ways for how the wireless device 200 can obtain the indication will be provided below.

Upon having obtained the indication the wireless device 200 may thus perform the switching. Hence, the wireless device 200 is configured to, in a step S114, selectively switch between the first coverage enhancement service mode and the second coverage enhancement service mode according to the indication. In this respect the switch module 210b may comprise instructions that when executed by the wireless device 200 causes the processing circuitry 210, possibly in conjunction with the communications interface 220 and the storage medium 230, to selectively switch between the first coverage enhancement service mode and the second coverage enhancement service mode according to the indication in order for the wireless device 200 to perform step S114.

Embodiments relating to further details of coverage enhancement service mode selection as performed by the wireless device 200 will now be disclosed.

There may different examples of first coverage enhancement service mode and second coverage enhancement service mode. According to an embodiment, coverage enhancement using a higher number of transmission repetitions is used in the first coverage enhancement service mode than in the second coverage enhancement service mode. The second coverage enhancement service mode may use only one single transmission and hence the first coverage enhancement service mode uses at least one transmission repetitions. Additionally or alternatively, according to an embodiment coverage enhancement is enabled in the first coverage enhancement service mode and coverage enhancement is disabled in the second coverage enhancement service mode. Hence, the first coverage enhancement service mode could imply that a coverage enhancement service is enabled and the second coverage enhancement service mode could imply that the coverage enhancement service is disabled. Additionally or alternatively, according to an embodiment, the first coverage enhancement service mode could correspond to mode A for Radio Resource Control (RRC) Connected mode and the second coverage enhancement service mode could correspond to mode B for RRC Connected mode.

Reference is now made to FIG. 6 illustrating methods for coverage enhancement service mode selection as performed by the wireless device 200 according to further embodiments. According to FIG. 6 it is assumed that steps S102 and S114 are performed as defined above.

There may be different ways for the wireless device 200 to obtain the indication in step S102. Different embodiments relating thereto will now be described in turn.

In general terms, if network control is preferred, the network node 300 can be configured to grant or deny a request from the wireless device 200 to switch between the first coverage enhancement service mode and the second coverage enhancement service mode. Further, it could be up to the network node 300 to command the wireless device 200 to switch between the first coverage enhancement service mode and the second coverage enhancement service mode. According to a first embodiment the indication is network initiated. According to the first embodiment the indication is in step S102 obtained from the network node 300. The wireless device 200 can then be configured to, in a step S104, provide an acknowledgment of reception of the indication to the network node 300. The acknowledgment of reception of the indication is provided before the wireless device 200 selectively switches between the first coverage enhancement service mode and the second coverage enhancement service mode. In this respect the provide module 210c may comprise instructions that when executed by the wireless device 200 causes the processing circuitry 210, possibly in conjunction with the communications interface 220 and the storage medium 230, to provide the acknowledgment of reception of the indication in order for the wireless device 200 to perform step S104. The indication can in the first embodiment be obtained in a paging message or a handover command message from the network node 300. Alternatively, the indication can in the first embodiment be obtained in a radio resource control connection release message or a radio link control status report poll. The acknowledgment is then provided in an acknowledgment message thereof, i.e., of the radio resource control connection release message or the radio link control status report poll.

According to a second embodiment and a third embodiment indication is wireless device initiated. According to the second embodiment the wireless device 200 is configured to, in a step S106, provide the indication in a request to the network node 300 for the wireless device 200 to switch between the first coverage enhancement service mode and the second coverage enhancement service mode. In this respect the provide module 210c may comprise instructions that when executed by the wireless device 200 causes the processing circuitry 210, possibly in conjunction with the communications interface 220 and the storage medium 230, to provide the indication in the request in order for the wireless device 200 to perform step S106. The wireless device 200 can then be configured to, in a step S108, obtain a response to the request from the network node 300. The response grants the wireless device 200 to switch between the first coverage enhancement service mode and the second coverage enhancement service mode. The response is obtained before the wireless device 200 selectively switches between the first coverage enhancement service mode and the second coverage enhancement service mode. In this respect the obtain module 210a may comprise instructions that when executed by the wireless device 200 causes the processing circuitry 210, possibly in conjunction with the communications interface 220 and the storage medium 230, to obtain the response to the request in order for the wireless device 200 to perform step S108. The indication can, in the second embodiment, be provided to the network node 300 during a network attachment procedure as a non-access stratum (NAS) message, or during a tracking area update (TAU) procedure. The indication could request the wireless device 200 to be in a legacy coverage mode. One example of such a network attachment procedure is provided in FIG. 5.3.4.1-1 in 3GPP TS 23.401 where the indication could be provided in the NAS Service Request message.

According to the third embodiment the wireless device 200 is configured to, in a step S110, provide the indication to the network node 300. In this respect the provide module 210c may comprise instructions that when executed by the wireless device 200 causes the processing circuitry 210, possibly in conjunction with the communications interface 220 and the storage medium 230, to provide the indication to the network node 300 in order for the wireless device 200 to perform step S110. In contrast to the second embodiment the indication provided in the third embodiment is not a request but an indication that the wireless device 200 by itself has determined to selectively switch between the first coverage enhancement service mode and the second coverage enhancement service mode. In the third embodiment the wireless device 200 is configured to, in a step S112, obtain an acknowledgment of reception of the indication from the network node 300 before selectively switching between the first coverage enhancement service mode and the second coverage enhancement service mode. In this respect the obtain module 210a may comprise instructions that when executed by the wireless device 200 causes the processing circuitry 210, possibly in conjunction with the communications interface 220 and the storage medium 230, to obtain the acknowledgment of reception of the indication from the network node 300 in order for the wireless device 200 to perform step S112.

The wireless device 200 may act differently depending on if the wireless device 200 is in the first coverage enhancement service mode or in the second coverage enhancement mode, respectively. Different embodiments relating thereto will now be described in turn.

Figure 9:
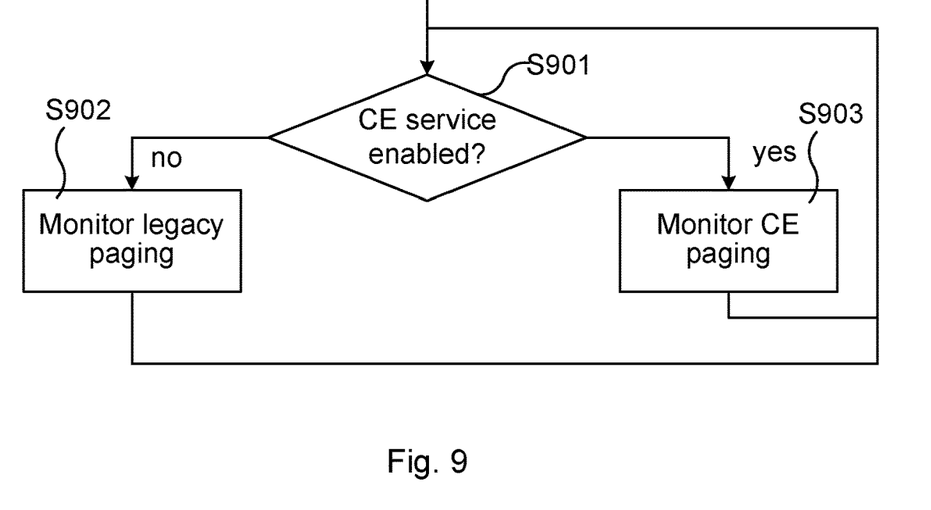

For example for the network node 300 not to have to page the wireless device 200 at the highest repetition level (which would often be the case since the exact coverage enhancement level (as defined by the coverage enhancement mode) can be difficult to determine, especially for non-stationary wireless devices), it can be beneficial if the network node 300 has knowledge of whether or not the wireless device is in normal coverage (NC) or not. The wireless device 200 may thus be paged differently in the first coverage enhancement service mode and in the second coverage enhancement mode, where fewer transmission repetitions of the paging signals are used in the second coverage enhancement service mode than in the first coverage enhancement mode, and/or where the frequency bandwidth used for the paging signals used in the second coverage enhancement service mode is more narrow than the frequency bandwidth used for the paging signals in the first coverage enhancement service mode. In this respect, as noted above, legacy paging in normal coverage is scheduled with PDCCH over the full system frequency bandwidth, whereas CE paging is scheduled with M-PDCCH within a frequency bandwidth of only 1.4 MHz. Hence, according to an embodiment the wireless device 200 is configured to, in a step S116, perform a paging procedure, wherein the paging procedure is dependent on which of the first coverage enhancement service mode and the second coverage enhancement service mode the wireless device 200 currently is using. In this respect the paging module 210*d* may comprise instructions that when executed by the wireless device 200 causes the processing circuitry 210, possibly in conjunction with the communications interface 220 and the storage medium 230, to perform a paging procedure being dependent on which of the first coverage enhancement service mode and the second coverage enhancement service mode the wireless device 200 currently is using in order for the wireless device 200 to perform step S116. Depending on the coverage enhancement service mode for the wireless device 200, the wireless device 200 will be paged in a different manner. FIG. 9 is a flowchart of a wireless device paging monitoring process as performed by the wireless device 200. The wireless device 200 checks if a coverage enhancement service is enabled or not, step S901. If the coverage enhancement service is not enabled the wireless device 200 monitors paging according to a legacy procedure, step S902. If the coverage enhancement service is enabled the wireless device 200 monitors paging according to a paging procedure for coverage enhancement, step S903. Steps S901-S903 may thus implement step S116.

The coverage enhancement service mode could also affect wireless device behavior and network node behavior related to other procedures than paging. For example, different mobility measurement procedures can apply depending on whether coverage enhancement is enabled or not. Thus, the wireless device 200 may perform different types of mobility measurement procedures in the first coverage enhancement service mode and in the second coverage enhancement mode, where fewer transmission repetitions of the mobility measurements are made in the second coverage enhancement service mode than in the first coverage enhancement service mode. Hence, according to an embodiment the wireless device 200 is configured to, in a step S118, perform a mobility measurement procedure, wherein the mobility measurement is dependent on which of the first coverage enhancement service mode and the second coverage enhancement service mode the wireless device 200 currently is using. In this respect the mobility measurement module 210*e* may comprise instructions that when executed by the wireless device 200 causes the processing circuitry 210, possibly in conjunction with the communications interface 220 and the storage medium 230, to perform a mobility measurement procedure being dependent on which of the first coverage enhancement service mode and the second coverage enhancement service mode the wireless device 200 currently is using in order for the wireless device 200 to perform step S118. In this respect, the wireless device paging monitoring process of FIG. 9 could be adapted to a mobility measurement procedure where the step S902 of monitoring legacy paging is replaced by a step of performing legacy mobility measurements and where the step S903 of monitoring CE paging is replaced by a step of performing CE mobility measurements.

Other examples of procedures that could be affected depending on whether coverage enhancement is enabled or not include, but are not limited to, random access (RA), cell measurements, cell search, cell selection, and cell re-selection. For example, if the wireless device 200 is in a coverage enhancement service mode where coverage enhancement is disabled it could not be allowed to transmit RA with coverage enhancement; the network node 300 may simply ignore/reject any RA attempts in higher CE levels (all but coverage enhancement disabled). For example, the wireless device 200 can have different criteria for which cells can be considered as neighbour cells depending on whether coverage enhancement is enabled or not.

In general, procedures that could be affected depending on whether coverage enhancement is enabled or not include are those procedures for which both the wireless device 200 and the network node 300 should have the same understanding of the coverage enhancement service mode.

Reference is now made to FIG. 7 illustrating a method for coverage enhancement service mode selection as performed by the network node 300 according to an embodiment.

The network node 300 is assumed to serve a wireless device 200 configured to support at least a first coverage enhancement service mode and a second coverage enhancement service mode. Examples of the first coverage enhancement service mode and the second coverage enhancement service mode have been provided above and further examples will be provided below. The network node 300 is therefore configured to, in a step S202, obtain an indication for the wireless device 200 to switch between the first coverage enhancement service mode and the second coverage enhancement service mode. In this respect the obtain module 310*a* may comprise instructions that when executed by the network node 300 causes the processing circuitry 310, possibly in conjunction with the communications interface 320 and the storage medium 330, to obtain the indication in order for the network node 300 to perform step S202.

Upon having obtained the indication the network node 300 may thus selectively switch the wireless device 200. Hence, the network node 300 is configured to, in a step S212, selectively switch the wireless device 200 between the first coverage enhancement service mode and the second coverage enhancement service mode according to the indication. In this respect the switch module 310*b* may comprise instructions that when executed by the network node 300 causes the processing circuitry 310, possibly in conjunction with the communications interface 320 and the storage medium 330, to selectively switch the wireless device 200 between the first coverage enhancement service mode and the second coverage enhancement service mode according to the indication in order for the network node 300 to perform step S212.

Reference is now made to FIG. 8 illustrating methods for coverage enhancement service mode selection as performed by the network node 300 according to further embodiments. According to FIG. 8 it is assumed that steps S202 and S212 are performed as defined above.

There may be different ways for the network node 300 to obtain the indication in step S202. Different embodiments relating thereto will now be described in turn. These embodiments are related to the above first, second, and third embodiments of different ways for the wireless device 200 to obtain the indication in step S102.

According to the first embodiment the indication is network initiated. As disclosed above, according to the first embodiment the indication is in step S102 obtained from the network node 300. According to the first embodiment the indication is in step S202 obtained by the network node 300. According to the first embodiment the network node 300 is therefore configured to, in a step S204, provide the indication to the wireless device 200. In this respect the provide module 310c may comprise instructions that when executed by the network node 300 causes the processing circuitry 310, possibly in conjunction with the communications interface 320 and the storage medium 330, to provide the indication to the wireless device 200 in order for the network node 300 to perform step S204. As disclosed above, the wireless device 200 can obtain the request and provide an acknowledgement thereof. Hence, according to the first embodiment the network node 300 is configured to, in a step S206, obtain an acknowledgment of reception of the indication from the wireless device 200. The acknowledgement is received before the network node 300 selectively switches the wireless device 200 between the first coverage enhancement service mode and the second coverage enhancement service mode according to the indication. In this respect the obtain module 310a may comprise instructions that when executed by the network node 300 causes the processing circuitry 310, possibly in conjunction with the communications interface 320 and the storage medium 330, to obtain an acknowledgment of reception of the indication from the wireless device 200 in order for the network node 300 to perform step S206.

According to the second embodiment and the third embodiment the indication is wireless device initiated. As disclosed above, according to the second embodiment the wireless device 200, in a step S106, provides the indication in a request to the network node 300 for the wireless device 200 to switch between the first coverage enhancement service mode and the second coverage enhancement service mode. According to the second embodiment the network node 300 is therefore configured to, in a step S202a, obtain the indication in a request from the wireless device 200 to switch between the first coverage enhancement service mode and the second coverage enhancement service mode. In this respect the obtain module 310a may comprise instructions that when executed by the network node 300 causes the processing circuitry 310, possibly in conjunction with the communications interface 320 and the storage medium 330, to obtain the indication in the request from the wireless device 200 to switch between the first coverage enhancement service mode and the second coverage enhancement service mode in order for the network node 300 to perform step S202a. The network node can then, in the second embodiment, be configured to, in a step S208, provide a response to the request to the wireless device 200. The response grants the wireless device 200 to switch between the first coverage enhancement service mode and the second coverage enhancement service mode. The response is provided before the network node 300 selectively switches the wireless device 200 between the first coverage enhancement service mode and the second coverage enhancement service mode according to the indication. In this respect the provide module 310c may comprise instructions that when executed by the network node 300 causes the processing circuitry 310, possibly in conjunction with the communications interface 320 and the storage medium 330, to provide the response to the request to the wireless device 200 in order for the network node 300 to perform step S208.

As disclosed above, according to the third embodiment the wireless device 200, in a step S110, provides the indication to the network node 300. According to the third embodiment the network node 300 is therefore configured to, in a step S202b, obtain the indication from the wireless device 200. In this respect the obtain module 310a may comprise instructions that when executed by the network node 300 causes the processing circuitry 310, possibly in conjunction with the communications interface 320 and the storage medium 330, to obtain the indication from the wireless device 200 in order for the network node 300 to perform step S202b. As disclosed above, in contrast to the second embodiment the indication provided in the third embodiment is not a request but an indication that the wireless device 200 by itself has determined to selectively switch between the first coverage enhancement service mode and the second coverage enhancement service mode. The network node can therefore, in the third embodiment, be configured to, in a step S210, provide an acknowledgment of reception of the indication to the wireless device 200 before selectively switching the wireless device 200 between the first coverage enhancement service mode and the second coverage enhancement service mode according to the indication. In this respect the provide module 310c may comprise instructions that when executed by the network node 300 causes the processing circuitry 310, possibly in conjunction with the communications interface 320 and the storage medium 330, to provide the acknowledgment of reception of the indication to the wireless device 200 in order for the network node 300 to perform step S210.

The network node 300 may act differently depending on if the wireless device 200 is in the first coverage enhancement service mode or in the second coverage enhancement mode, respectively. Different embodiments relating thereto will now be described in turn.

Figure 10:
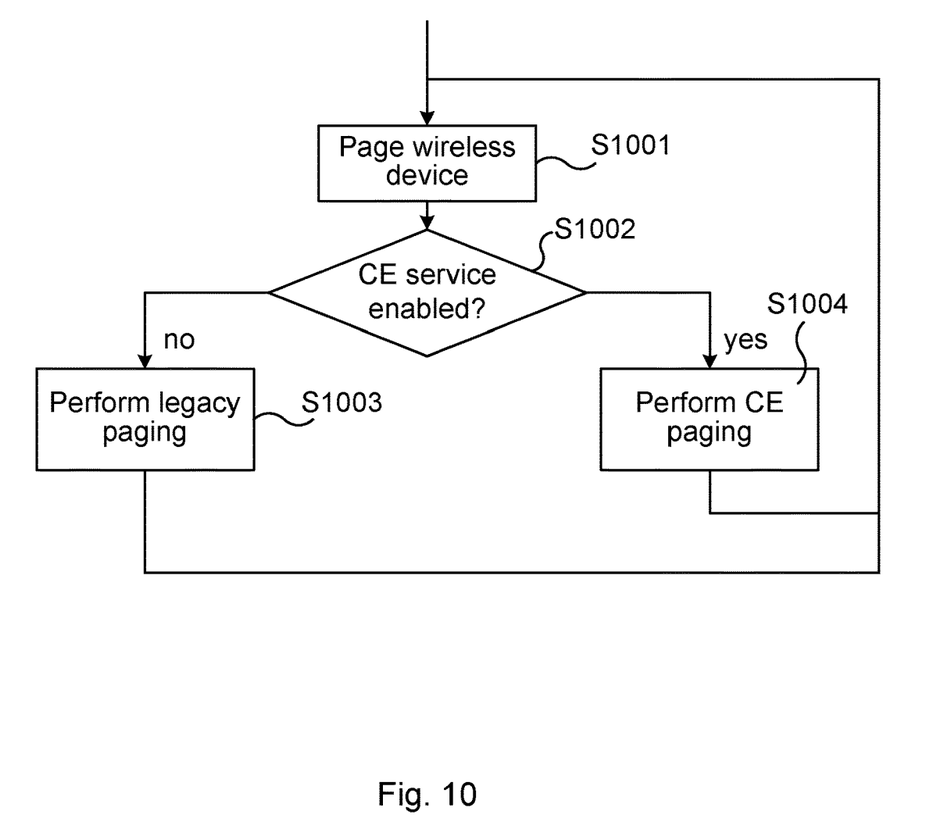

For example, as disclosed above, the network node 300 can page the wireless device 200 differently in the first coverage enhancement service mode and in the second coverage enhancement service mode. Hence, according to an embodiment the network node 300 is configured to, in a step S214, perform a paging procedure, wherein the paging procedure is dependent on which of the first coverage enhancement service mode and the second coverage enhancement service mode the wireless device 200 currently is using. In this respect the page module 310d may comprise instructions that when executed by the network node 300 causes the processing circuitry 310, possibly in conjunction with the communications interface 320 and the storage medium 330, to perform a paging procedure being dependent on which of the first coverage enhancement service mode and the second coverage enhancement service mode the wireless device 200 currently is using in order for the network node 300 to perform step S214. FIG. 10 is a flowchart of a paging process as performed by the network node 300. The network node 300 obtains an indication to page the wireless device, step S1001. The network node 300 checks if a coverage enhancement service is enabled or not for the wireless device 200, step S1002. If the coverage enhancement service is not enabled the network node 300 pages the wireless device 200 according to a legacy procedure, step S1003. If the coverage enhancement service is enabled the network node 300 pages the wireless device 200 according to a paging procedure for coverage enhancement, step S1004. Steps S1001-S1004 may thus implement step S214.

As further disclosed above, the coverage enhancement service mode could also affect wireless device behavior and network node behavior related to other procedures than paging. Thus, the network node 300 may perform different types of mobility measurement procedures with the wireless device 200 depending on if the wireless device 200 is in the first coverage enhancement service mode or in the second coverage enhancement service mode. In this respect, it can typically be the wireless device 200 that performs mobility measurements and reports the mobility measurements to the network node 300. Thus, the network node 300 may only inform the wireless device 200 on what to measure. For example, the network node 300 may provide the wireless device 200 with a list of neighbour cells and instruct the wireless device 200 to report signal strength measurements for these cells to the network node 300 with some periodicity. Hence, according to an embodiment the network node 300 is configured to, in a step S216, perform a mobility measurement procedure with the wireless device 200, wherein the mobility measurement is dependent on which of the first coverage enhancement service mode and the second coverage enhancement service mode the wireless device 200 currently is using. In this respect the mobility measurement module 310e may comprise instructions that when executed by the network node 300 causes the processing circuitry 310, possibly in conjunction with the communications interface 320 and the storage medium 330, to perform a mobility measurement procedure being dependent on which of the first coverage enhancement service mode and the second coverage enhancement service mode the wireless device 200 currently is using in order for the network node 300 to perform step S216. In this respect, the paging process of FIG. 10 could be adapted to a mobility measurement procedure where the step S1003 of performing legacy paging of the wireless device 200 is replaced by a step of performing legacy mobility measurements of the wireless device 200 and where the step S1004 of performing CE paging of the wireless device 200 is replaced by a step of performing CE mobility measurements of the wireless device 200.

The network node 300 could provide an indication to a management node, such as a policy and charging rules function (PCRF) node in the core network 150 regarding which coverage enhancement service mode the wireless device 300 is currently in so as to enables a service provider, or operator, to access this information.

Subscription information of the wireless device 200 can be used to determine whether the wireless device 200 is allowed to switch between the first coverage enhancement service mode and the second coverage enhancement service mode. For example, the subscription information may indicate that the wireless device 200 is only allowed to be in one of the first coverage enhancement service mode and the second coverage enhancement service mode. In such a case the wireless device 200 is not allowed to switch between the first coverage enhancement service mode and the second coverage enhancement service mode. For example, the subscription information may indicate that the wireless device 200 is allowed to be in one of the first coverage enhancement service mode and the second coverage enhancement service mode during a predetermined amount of time. The wireless device 200 is thus forced to be in the other of the first coverage enhancement service mode and the second coverage enhancement service mode when the predetermined amount of time has expired.

There may be different factors that can trigger the wireless device 200 and/or the network node 300 to obtain the indication in steps S102 and S202, respectively. Different embodiments relating thereto will now be described in turn.

According to a first embodiment the indication is triggered by the use of a protocol by the wireless device 200 during a predetermined time interval reaching a first predetermined threshold value. That is, the indication is triggered if the wireless device 200 uses a particular protocol at least a number of times corresponding to the first predetermined threshold value during a predetermined time interval. The protocol can be a Layer 2 protocol, or a Layer 3 protocol, such as a protocol for hybrid automatic repeat request (HARQ), radio link control (RLC), packet data convergence protocol (PDCP), or radio resource control (RRC) signalling. The indication can then be triggered if the number of retransmissions for HARQ reaches the first predetermined threshold value, if the number of retransmissions for RLC reaches the first predetermined threshold value, and/or if the HARQ block error rate reaches the first predetermined threshold value (assuming that the wireless device 200 is in a coverage enhancement service mode where coverage enhancement currently is disabled).

According to a second embodiment the indication is triggered by a value of a timer reaching a second predetermined threshold value. The timer can be a Layer 2 timer, or a Layer 3 timer. The timer could, for example, be any of the following: RLC t-Reordering, RLC t-PollRetransmit, RLC Poll timer, PDCH discardTime timeout, RRC Connection-Request timer (timer T300), RRC ConnectionReestabilshmentRequest timer (timer T301), RRC 'physical layer problems' (timer T310), or RRC connection re-establishment procedure (timer T311), where RLC is short for Radio Link Control, there t-Reordering denotes timer reordering, where t-PollRetransmit denotes timer for poll retransmit, where PDCH is short for Packet Data Channel, and where RRC is short for Radio Resource Control.

The indication can be triggered if the timer is X seconds from expiring a number of N times. Here, X and N would not always have to be used in combination. If the maximum number of HARQ attempts is 5, N could be 3.7 and when the average number of HARQ attempts for the wireless device 200 becomes larger than 3.7 it would be determined to, if possible, make a switch of coverage enhancement service mode to a coverage enhancement service mode involving a higher coverage enhancement service. On a more long term, N could be the number of radio-link-failures that occurred during a time window corresponding to the last 24 hours of operation of the wireless device 200. The value of X could for example be the time for RRC connection setup. If the RRC connection setup procedure has taken the wireless device longer than 500 ms (i.e., X=500 ms) the last N=5 times the network node 300 could trigger a switch of coverage enhancement service mode to a coverage enhancement service mode involving a higher coverage enhancement service (if possible).

According to a second embodiment the indication is triggered by collected statistics of the wireless device 200 and/or predicted behaviour of the wireless device 200. In this respect, statistical measures, e.g. filtered and/or averaged over time, could be used for the evaluation and comparison to any of the first predetermined threshold value and the second predetermined threshold value. Therefore the first predetermined threshold value may not be confined to integer numbers. Further, the values of X and N may be determined by the network.

Figure 11:
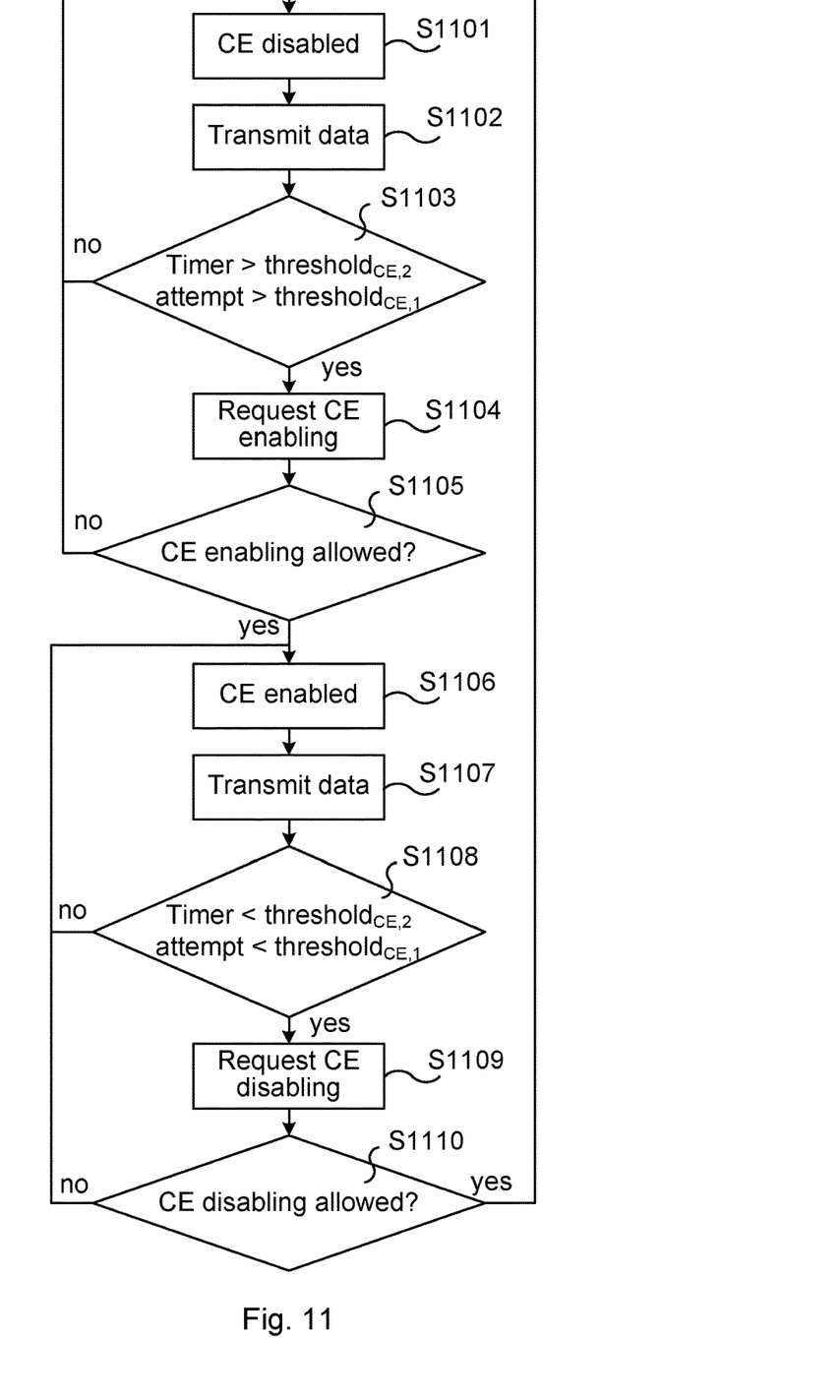

One particular embodiment for coverage enhancement service mode selection based on at least some of the above disclosed embodiments will now be disclosed in detail with reference to the flowchart of FIG. 11.

S1101: The wireless device 200 is in a coverage enhancement service mode where coverage enhancement is disabled.

S1102: The wireless device 200 transmits data.

S1103: If a value of a timer has reached a second predetermined threshold value (as defined by Timer>threshold$_{CE,2}$) and/or a use of a protocol by the wireless device 200 during a predetermined time interval has reached a first predetermined threshold value (as defined by attempt>threshold$_{CE,1}$), step S1104 is entered; else step S1101 is entered. Here threshold$_{CE,1}$ denotes the first predetermined threshold value, and threshold$_{CE,2}$ denotes the second predetermined threshold value.

S1104: Coverage enhancement to be enabled is requested. One way to implement step S1104 is to perform any of steps S102, S106, S110, S202, S202a, S202b, S204.

S1105: If enabling coverage enhancement for the wireless device 200 is allowed, step S1106 is entered; else step S1101 is entered.

S1106: Coverage enhancement of the wireless device 200 is enabled. The wireless device 200 thus switches to a coverage enhancement service mode where coverage enhancement is disabled. One way to implement step S1104 is to perform any of steps S114, S212.

S1107: The wireless device 200 transmits data.

S1108: If a value of a timer has not reached a second predetermined threshold value (as defined by Timer<threshold$_{CE,2}$) and/or a use of a protocol by the wireless device 200 during a predetermined time interval has not reached the first predetermined threshold value (as defined by attempt<threshold$_{CE,1}$, step S1109 is entered; else step S1106 is entered. Here threshold$_{CE,2}$ denotes the first predetermined threshold value, and threshold$_{CE,2}$ denotes the second predetermined threshold value.

S1109: Coverage enhancement to be disabled is requested. One way to implement step S1109 is to perform any of steps S102, S106, S110, S202, S202a, S202b, S204.

S1110: If disabling coverage enhancement of the wireless device 200 is allowed, step S1101 is entered (where wireless device 200 thus switches to a coverage enhancement service mode where coverage enhancement is enabled); else step S1106 is entered. One way to implement step S1110 is to perform any of steps S114, S212.

Figure 12:
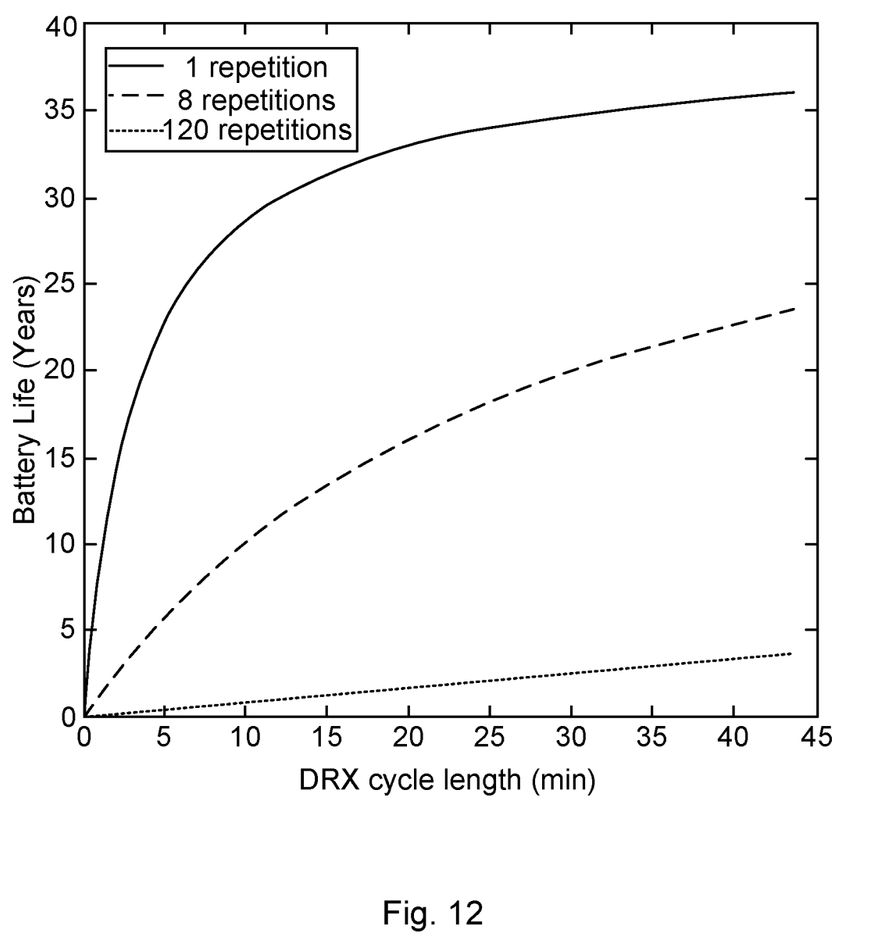
FIG. 12 shows simulation results according to an embodiment.

FIG. 12 shows simulation results in terms of battery lifetime in years as a function of DRX (discontinuous reception) cycle length in minutes. If a DRX cycle of 10 min is used the battery life is improved from less than 1 year up to 29 years if the wireless device 200 monitors a paging procedure with only one transmission compared to a monitoring a paging procedure with 120 repeated transmissions.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for coverage enhancement service mode selection, the method being performed by a wireless device, the method comprising:
   obtaining an indication to switch between a first coverage enhancement service mode and a second coverage enhancement service mode;
   selectively switching between the first coverage enhancement service mode and the second coverage enhancement service mode according to the indication, wherein coverage enhancement is enabled in the first coverage enhancement service mode and disabled in the second coverage enhancement service mode; and
   performing one of a paging procedure and a mobility measurement procedure, wherein which one of the paging procedure and the mobility management procedure is performed is dependent on which of the first coverage enhancement service mode and the second coverage enhancement service mode the wireless device currently is using, wherein coverage enhancement using a higher number of transmission repetitions is used in the first coverage enhancement service mode than in the second coverage enhancement service mode.

2. The method according to claim 1, wherein the indication is triggered by use of a protocol by the wireless device during a predetermined time interval reaching a first predetermined threshold value.

3. The method according to claim 2, wherein the indication is triggered if at least one of: a number of retransmissions for hybrid automatic repeat request (HARQ) reaches the first predetermined threshold value; a number of retransmissions for radio link control (RLC) reaches the first predetermined threshold value; and a HARQ block error rate reaches the first predetermined threshold value.

4. The method according to claim 1, wherein the indication is triggered by a value of a timer reaching a second predetermined threshold value, wherein the timer is a Layer 2 timer or a Layer 3 timer, and wherein the indication is triggered if the timer is a predetermined number of seconds from expiring a predetermined number of times.

5. The method according to claim 1, wherein the indication is obtained in one of: a paging message; a handover command message; a radio resource control connection release message; and a radio link control status report poll.

6. The method according to claim 1, further comprising:
   providing the indication in a request to a network node to switch between the first coverage enhancement service mode and the second coverage enhancement mode; and
   obtaining a response to the request from the network node, the response granting the wireless device to switch between the first coverage enhancement service mode and the second coverage enhancement mode, wherein the response is obtained before selectively switching between the first coverage enhancement service mode and the second coverage enhancement service mode.

7. The method according to claim 6, wherein the indication is provided to the network node during one of: a network attachment procedure as a non-access stratum message; and a tracking area update procedure.

8. The method according to claim 6, wherein the indication requests the wireless device to be in a legacy coverage mode.

9. The method according to claim 1, further comprising:
   providing the indication to a network node; and
   obtaining an acknowledgment of reception of the indication from the network node before selectively switching between the first coverage enhancement service mode and the second coverage enhancement service mode.

10. A method for coverage enhancement service mode selection, the method being performed by a network node, comprising:
    obtaining an indication for a wireless device to switch between a first coverage enhancement service mode and a second coverage enhancement service mode;
    selectively switching the wireless device between the first coverage enhancement service mode and the second coverage enhancement service mode according to the indication, wherein coverage enhancement is enabled in the first coverage enhancement service mode and disabled in the second coverage enhancement service mode; and
    performing one of a paging procedure and a mobility measurement procedure, wherein which one of the paging procedure and the mobility management procedure is performed is dependent on which of the first coverage enhancement service mode and the second coverage enhancement service mode the wireless device currently is using, wherein coverage enhancement using a higher number of transmission repetitions is used in the first coverage enhancement service mode than in the second coverage enhancement service mode.

11. The method according to claim 10, further comprising:

providing the indication to the wireless device; and obtaining an acknowledgment of reception of the indication from the wireless device before selectively switching the wireless device between the first coverage enhancement service mode and the second coverage enhancement service mode according to the indication.

12. The method according to claim 10, further comprising:

obtaining the indication in a request from the wireless device to switch between the first coverage enhancement service mode and the second coverage enhancement mode; and providing a response to the request to the wireless device, the response granting the wireless device to switch between the first coverage enhancement service mode and the second coverage enhancement mode, wherein the response is provided before selectively switching the wireless device between the first coverage enhancement service mode and the second coverage enhancement service mode according to the indication.

13. The method according to claim 10, further comprising:

obtaining the indication from the wireless device; and providing an acknowledgment of reception of the indication to the wireless device before selectively switching the wireless device between the first coverage enhancement service mode and the second coverage enhancement service mode according to the indication.

14. A wireless device configured for coverage enhancement service mode selection, the wireless device comprising:

transceiver circuitry configured for communicating with a wireless communication network; and processing circuitry operatively associated with the transceiver circuitry, the processing circuitry being configured to cause the wireless device to:

obtain an indication to switch between a first coverage enhancement service mode and a second coverage enhancement service mode;

selectively switch between the first coverage enhancement service mode and the second coverage enhancement service mode according to the indication, wherein coverage enhancement is enabled in the first coverage enhancement service mode and disabled in the second coverage enhancement service mode; and perform one of a paging procedure and a mobility measurement procedure, wherein which one of the paging procedure and the mobility management procedure is performed is dependent on which of the first coverage enhancement service mode and the second coverage enhancement service mode the wireless device currently is using, wherein coverage enhancement using a higher number of transmission repetitions is used in the first coverage enhancement service mode than in the second coverage enhancement service mode.

15. A network node configured for coverage enhancement service mode selection, the network node comprising:

communication circuitry configured for communicating with wireless devices; and processing circuitry operatively associated with the communication circuitry, the processing circuitry being configured to cause the network node to:

obtain an indication for a wireless device to switch between a first coverage enhancement service mode and a second coverage enhancement service mode;

selectively switch the wireless device between the first coverage enhancement service mode and the second coverage enhancement service mode according to the indication, wherein coverage enhancement is enabled in the first coverage enhancement service mode and disabled in the second coverage enhancement service mode; and perform one of a paging procedure and a mobility measurement procedure, wherein which one of the paging procedure and the mobility management procedure is performed is dependent on which of the first coverage enhancement service mode and the second coverage enhancement service mode the wireless device currently is using, wherein coverage enhancement using a higher number of transmission repetitions is used in the first coverage enhancement service mode than in the second coverage enhancement service mode.

* * * * *